United States Patent [19]

Woltz et al.

[11] Patent Number: 5,258,794
[45] Date of Patent: Nov. 2, 1993

[54] EXTENDED CAPACITY FILM MAGAZINE

[75] Inventors: Robert L. Woltz, Laguna Beach; Richard D. Balentine, Costa Mesa, both of Calif.

[73] Assignee: Seamag Incorporated, Newport Beach, Calif.

[21] Appl. No.: 971,359

[22] Filed: Nov. 4, 1992

[51] Int. Cl.$^5$ .................. G03B 17/26; G03B 17/02
[52] U.S. Cl. ..................... 354/275; 354/288; 354/215; 354/174
[58] Field of Search ............... 354/275, 288, 174, 212, 354/215, 217, 64

[56] References Cited

U.S. PATENT DOCUMENTS

| | | | |
|---|---|---|---|
| 684,221 | 10/1901 | Gill | 354/288 |
| 3,768,748 | 10/1973 | Pfefer | 354/212 X |
| 3,780,634 | 12/1973 | Osch | 354/275 |
| 4,268,143 | 5/1981 | Dearing et al. | 354/275 X |
| 4,894,674 | 1/1990 | Radov | 354/275 |
| 4,945,369 | 7/1990 | Fiorda | 354/174 X |
| 4,982,909 | 1/1991 | Pagano | 354/275 X |

*Primary Examiner*—Michael L. Gellner
*Assistant Examiner*—Jae N. Noh
*Attorney, Agent, or Firm*—James G. O'Neill

[57] ABSTRACT

An extended film magazine for an underwater camera is adapted to be attached to the camera in place of the rear door by a bezel means which provides watertight attachment between a housing of the magazine and the camera. The bezel means aligns and holds a first film holding cassette and a film take-up assembly having all of the operating components thereof, in the housing for easy access and loading. The bezel means also includes sealing means to effectively seal the magazine housing and the camera, and the film take-up assembly is mechanically coupled to the existing film transport mechanism of the camera to drive a take-up means held in this take-up assembly to move unexposed film from the film cassette, through the camera and onto the take-up means. The take-up assembly mechanically coupled to the existing film transport of the camera also includes a mechanical take-up drive and a counter means to measure the length of the film passed through the film transport, together with a light source to illuminate the counter so as to enable it to be read underwater, through a lens means in the housing.

20 Claims, 4 Drawing Sheets

EXTENDED CAPACITY FILM MAGAZINE

BACKGROUND OF THE INVENTION

1. Field of the Invention

The subject invention relates generally to film magazines and, more particularly, to an improved extended capacity film magazine assembly for use with a camera.

2. Description of Related Art

Increasing the amount of film available in a camera for use in many situations, such as in underwater photography, has long been a factor in the design of such cameras, or in magazines adapted for use with such cameras. Available cameras, including those useful for underwater photography, generally are constructed with the same basic components, including a camera body and lens, sealed together in such a manner that the camera includes one or more sealed compartments for holding and protecting various mechanisms in the camera, as well as film advanced through the camera.

As pointed out in U.S. Pat. No. 4,945,369 ('369), the disclosure of which is incorporated herein, in its entirety, by this reference thereto, the most popular underwater cameras currently in use are thirty-five millimeter, with the most widely used and known of these being that manufactured by Nikon Corporation and sold under the brand name NIKONOS V. Furthermore, as pointed out in this '369 patent, the NIKONOS V and other available underwater cameras are typically limited to a maximum film size or capacity of a thirty-six exposure roll of film. The problems discussed in the '369 patent regarding the limited size of the rolls of films and, therefore, the number of pictures which could be taken with known underwater cameras, or a plurality of such cameras, were somewhat alleviated by the enlarged magazine, hinged to the back of a camera, of the '369 patent. However, this magazine does not solve all of the existing problems discussed in the '369 patent, and raises further problems because of its expense, complexity and difficulty in use. Therefore, there still exists a need in the camera art for an easy to load extended film magazine adapted for connection to known cameras, and in particular, cameras for use underwater, which magazine is more economical to manufacture and capable of holding an extended length of film, at least as long as that disclosed in the '369 patent.

A disadvantage of present magazines for cameras, such as the magazine disclosed in the '369 patent, is that these magazines contain separate inner and outer housings which must snugly fit into each other, thereby requiring careful and costly machining of both of the housings.

A further disadvantage of the present magazines for cameras, such as the magazine disclosed in the '369 patent, is the economic waste that occurs because the separate housings thereof require the use of more materials, as well as electrical and mechanical components, such as the operating motor and circuit, switches, gears and certain other parts thereof. These extra components make the magazine more expensive as well as more complicated and difficult to manufacture and use. In cameras destined for use underwater, any magazine to extend the length of the film used therein, must necessarily be as uncomplicated as possible.

Finally, the feel and weight of these known magazines with their multiple housings and complicated operating parts does not allow for easy, sustained loading and use of such cameras and magazines underwater.

SUMMARY OF THE INVENTION

It is, therefore, an object of the present invention to provide an improved extended film magazine for an underwater camera.

It is another object of the invention to provide an improved extended film magazine assembly that is relatively light in weight and contains a minimum of components.

It is still another object of the invention to provide an improved extended film magazine for an underwater camera which replaces the existing door thereof, without requiring any modifications of the camera.

It is yet a further object of the present invention to provide an improved extended film magazine for an underwater camera which uses the existing film transport mechanism of the camera to transfer the film contained in one cassette to another cassette mounted in the magazine.

It is still a further object of the present invention to provide an improved extended film magazine for an underwater camera having an easily viewed counter and a single pushbutton operating means for illuminating such counter.

It is still an additional object of the present invention to provide an improved extended film magazine for an underwater camera having a water detection and alarm means therein.

These and other objects and advantages of the present invention are achieved by providing an extended film magazine for a camera, and, in particular, an underwater camera which replaces the existing rear door of the camera by a magazine which is improved in design, operation and use. The preferred embodiment of the magazine includes a single housing having a bezel means for watertight attachment between the housing and the camera. A first film cassette and a take-up assembly including a second take-up cassette and all of the operating components therefor, are held in the single housing for easy access and use, by the bezel means. The bezel means also includes liquid sealing means incorporated therein to effectively seal the magazine housing and the camera. The take-up assembly is frictionally coupled to the existing film transport mechanism of the camera to drive the second or take-up cassette means held therein to move unexposed film from the first cassette, through the camera and onto the take-up cassette means. The take-up assembly also includes counter means to count or measure the length of the film processed through the film transport, a light source to illuminate the counter, an end of film indicating means, and a water detection and alarm means, all of which are readable underwater, through a lens means in the housing.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DETAILED DESCRIPTION OF THE INVENTION

The following description is provided to enable any person skilled in the camera magazine and underwater camera arts to make and use the invention and sets forth the best modes contemplated by the inventor of carrying out his invention. Various modifications, however, will remain readily apparent to those skilled in the arts, since the generic principles of the present invention have been defined herein specifically to provide an improved, lightweight, relatively economical, extended film magazine for a camera, such as an underwater camera.

Figure 1:
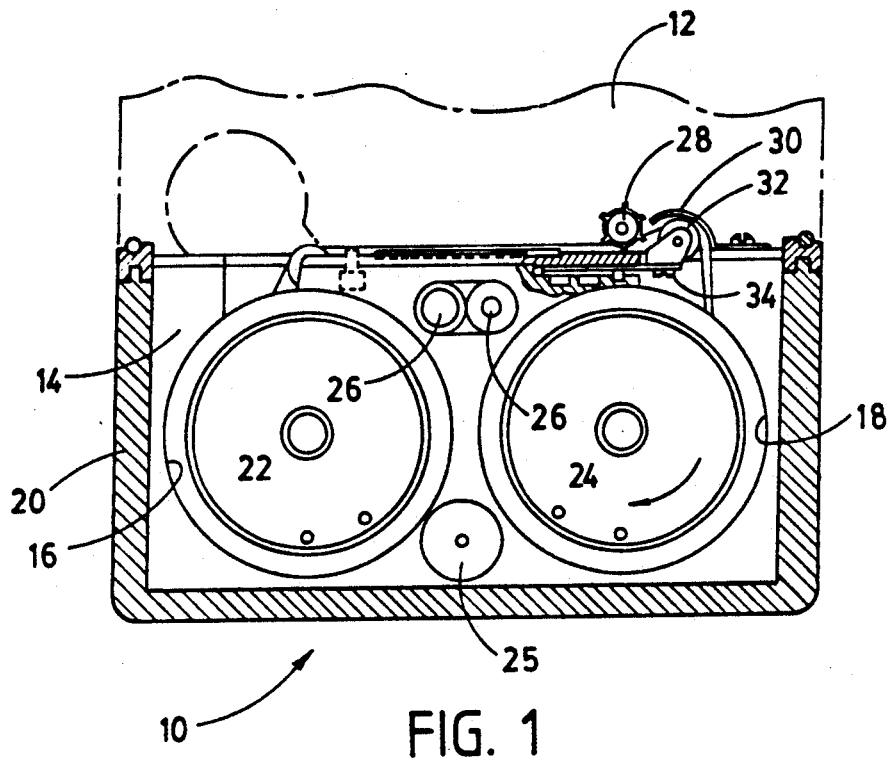
FIG. 1 is a cross-sectional view of a prior art magazine mounted to the back of a camera.

Referring to FIG. 1, there shown is a prior art magazine 10 for attachment to an underwater camera 12 from which the rear door (not shown) has been removed. A first or interior housing 14 having a pair of openings 16, 18 is shown mounted in a second or exterior housing 20. A canister of film 22 is placed in the opening 16, passed through the transport mechanism of the camera 12 and taken-up by a take-up canister 24 mounted in the second opening 18. The take-up canister is driven by an electric motor 25 through a gear arrangement (not shown) mounted in the first or interior housing, operated by batteries 26, to wind the film therein. Before entering the take-up canister 24, the film travels over a sprocket 28 in the camera and then under a film guide 30, secured to the interior housing 14, but extending into the camera housing. The film then passes over a pair of film rollers 32 also extending into the camera housing, which film rollers are mounted to the end of a sensing lever 34, also held in the interior housing 14. Other circuitry and mechanisms, not shown, are contained in the interior housing 14, to operate an exposure counter and the electric drive motor 25.

The present invention, as shown more fully in FIGS. 2-7, permits an improved extended film magazine 40 for mounting to the back of any camera, but which is described herein for attachment to an underwater camera 12, such as any 35 millimeter camera, including the NIKONOS V, mentioned above, to replace the rear door thereof. The present rear door of the camera 12 includes an O-ring seal of the type disclosed below. With this improved magazine 40 an economy of materials is achieved and a ready matching of the magazine to the camera 12, without requiring any modifications of the camera, except for removal of the rear door, is facilitated. The magazine of the present invention is merely mounted to the back of the camera by utilizing the existing hinge pin of the camera, driven out when the rear door was removed, and latching means on the other or opposite end of the magazine cooperating with the existing latching means in the camera, as described below. Additionally, the resulting camera and magazine allows for easier loading of an extended length of film, up to 33 feet long, and when sealed together, as explained more fully below, is entirely insulated when used underwater, by a bezel means 42.

Figure 3:
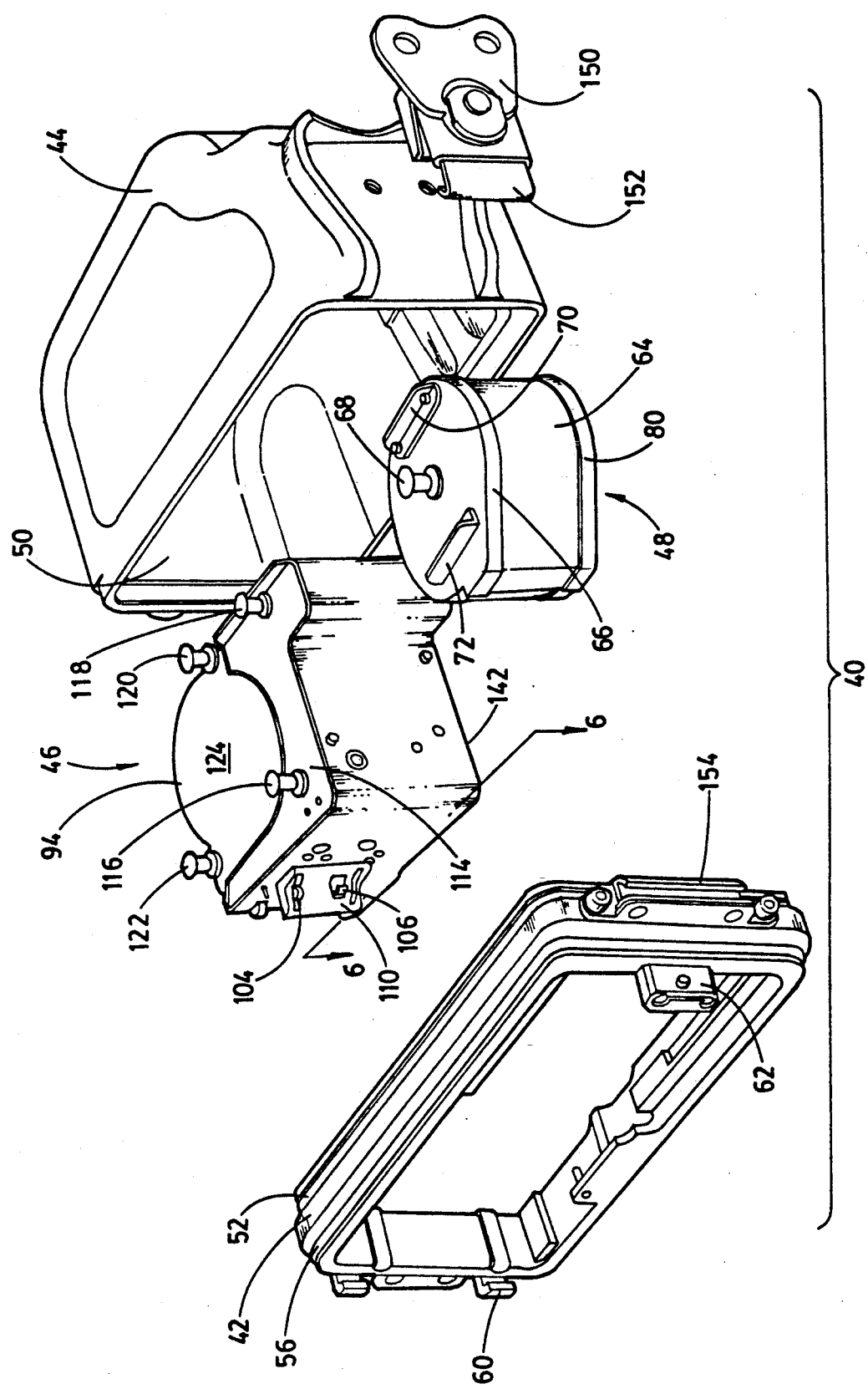
FIG. 3 is an exploded view of the improved extended film magazine of the present invention.
Figure 4:
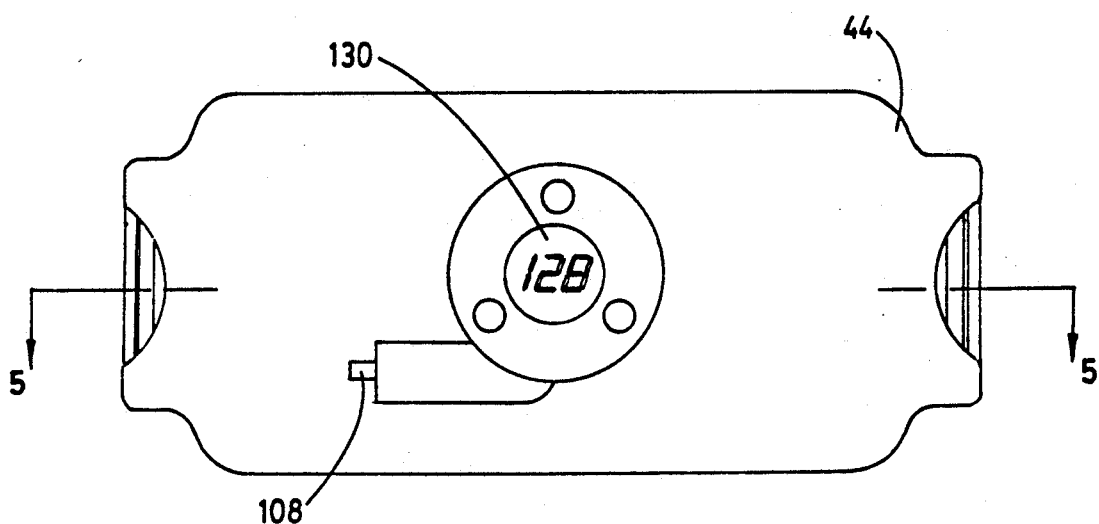
FIG. 4 is a rear elevational view of the magazine housing.
Figure 5:
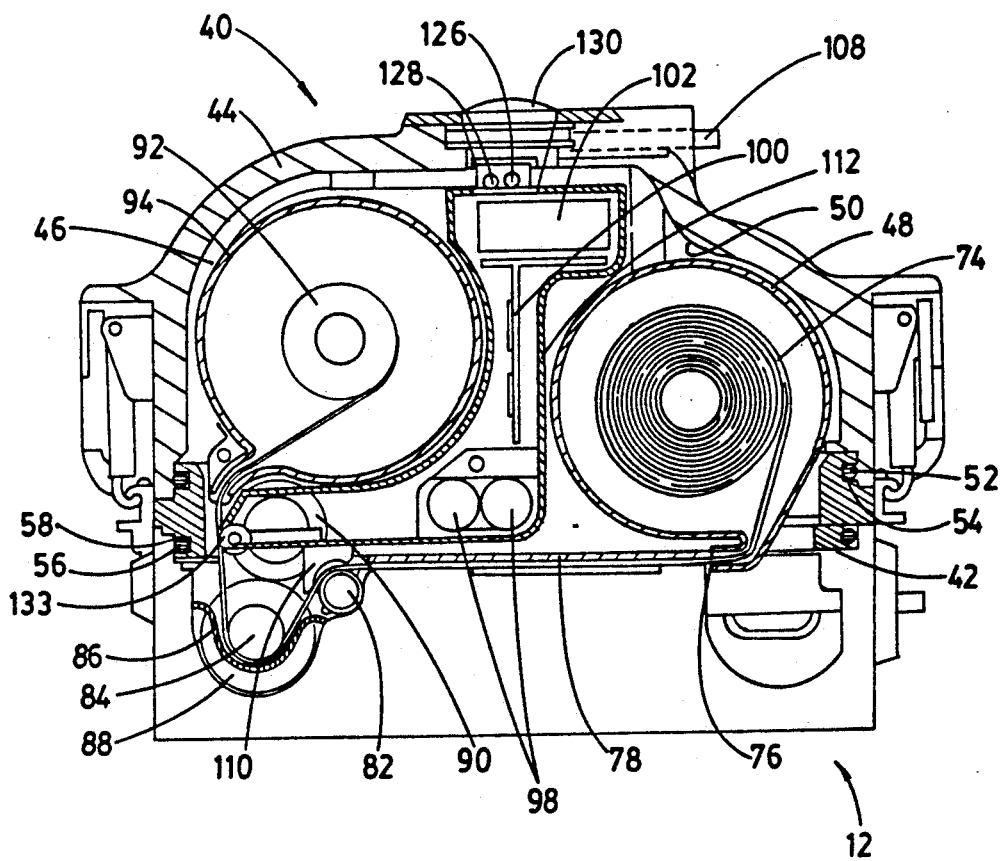
FIG. 5 is a cross-sectional view about line A—A of FIG. 4.

Referring to FIG. 3, an exploded view of the magazine 40, having the bezel 42, an external magazine housing 44 and a first or supply cassette means 48 and a take-up assembly means 46, is disclosed. The external magazine housing 44 is preferably fabricated, in the desired shape, to tightly hold the first cassette 48 and the take-up assembly 46 therein, as a single piece from a high strength but light weight material, such as aluminum, injection molded plastic, or the like, in a manner known to those skilled in the art. The external magazine housing 44 includes an internal compartment or opening 50 which defines the portion of the magazine assembly which holds and protects the first cassette 48, the take-up assembly 46 and any film contained therein. The bezel means 42 is formed, from any desired material, such as metal or plastic, as a substantially rectangular open frame sealingly connected to the interior compartment 50 of housing 44, in any known manner. The preferred embodiment shown in the drawings includes a first seal means, such as an O-ring seal 52, held in an annular slot or channel 54 formed in a first reduced annular portion of bezel means 42, which first slot 54, reduced annular portion and O-ring seal 52 are sized so as to snugly and sealingly fit into interior compartment 50 (as shown in FIG. 5). The preferred embodiment of the bezel means 42 also includes a second seal means, such as O-ring seal 56, held in an annular slot or channel 58 formed in a second reduced annular portion thereof. As also shown in FIG. 5, this second seal means is sealingly connected to the back of the camera 12, in the same manner as the first seal means, when it is desired to take an extended series of photographs underwater. The disclosed sealing means could, of course, be easily replaced with other sealing means if the magazine is to be used with other cameras and/or in other environments.

The bezel means 42 is shaped as a substantially rectangular open frame and sized so as to easily replace the rear door of the camera 12 and to be fastened to the rear of the camera, by being pressed directly into place. After insertion, a first end of the bezel is fixed to the camera by attaching a securing means 60 on the bezel to the existing hinge of the camera by a pin means, as described above. Latch means 62 secured to the outside surface of a second or other end of the bezel is capable of being secured to the existing latch means of the camera to aid in holding the bezel therein.

The first or film supply cassette means 48 is preferably formed as a substantially cylindrical, lighttight can or container having a hollow interior compartment 64, with a removable lid 66 at one end and a fixed lid 80 at the other end. This first cassette may be made from sheet metal or the like, in a manner known to those skilled in the art. The lid 66 may be snap fit to the first cassette, or may include other locking/removing means, such as a push pin type means 68 mounted substantially centrally thereof for insertion into an aperture or opening, not shown, formed in the interior of the compartment 64, in a manner known to those skilled in the art. The lid 66 is also preferably provided with first and second mounting flanges 70, 72 secured to the exterior thereof to assist in aligning and holding the first cassette in position between the bezel means 42 and the interior compartment 50, so as to accurately feed a roll of unexposed film 74, up to 33 feet long, held in the can 64 through a typical lighttight, felt lined elongated exit opening or slit 76. The film 74 is then passed under a pressure plate 78 of the camera and to a film transport system of the camera, as describe more fully below. Identical mounting flanges, not shown, are secured to the exterior of the other end or side lid 80 of the can. This plurality of flanges ensures accurate alignment of the first cassette 48 in the magazine and bezel.

Figure 2:
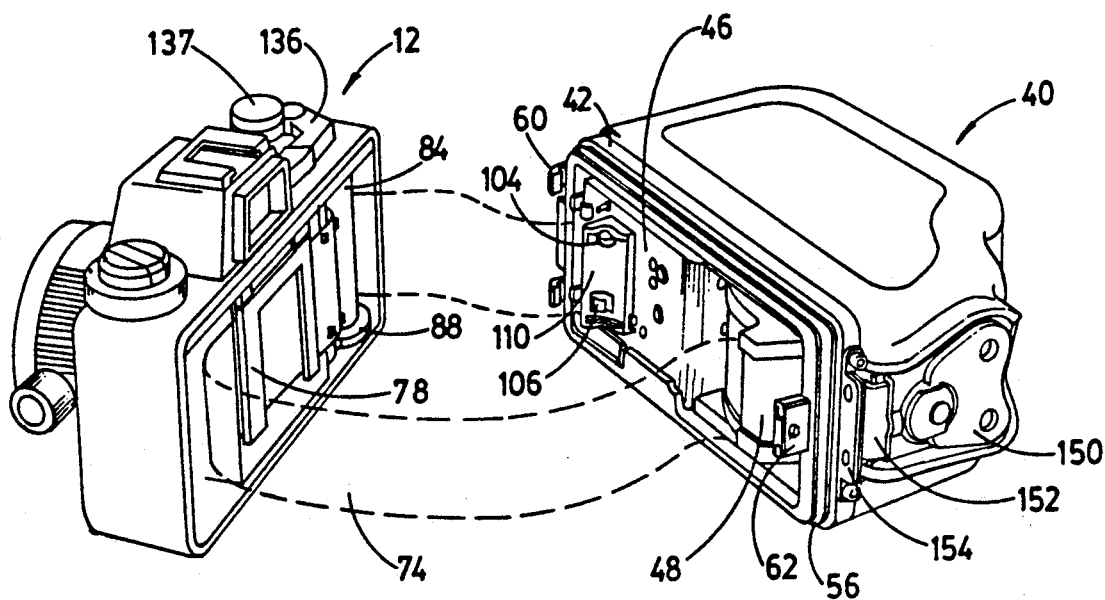
FIG. 2 is a perspective view of the improved extended film magazine of the present invention removed from a camera, showing the path of the film from the magazine to the camera and back to the magazine.

Referring to FIGS. 2 and 5, the film 74, after being passed under the pressure plate 78 of the camera, travels over a typical sprocket means 82 of the camera. Although this sprocket means 82 may contain two film drive portions having any number of teeth, in a preferred embodiment of the invention, each such drive portion of the sprocket contains 6 teeth about its periphery to drive the film, and the second or take-up assembly means 46 includes means, described below, to count or track the rotation of these teeth to count the number of exposures of film in the take-up assembly. After passing over the sprocket means, the film passes under a take-up spool 84 of the camera and, if needed, is guided therearound by a film guide means 86, specifically designed to be inserted in the existing take-up compartment in the film take-up side of the camera and follow the inside wall of this camera take-up compartment, below the take-up spool 84. In some situations, the film guide 86 may be formed so as to be placed nearer to the take-up spool 84, as shown in FIG. 5. The take-up spool 84 of the camera includes an enlarged disc or annular portion 88, having a serrated outer edge thereon. This serrated outer edge is normally actuated by the thumb or another finger of a user to start winding film onto the take-up spool 84 in the camera. In the present invention, however, the take-up assembly 46 is frictionally coupled to the serrated edge of disc 88 by a drive roller means 90, preferably being made from a resilient material or having a resilient outer driving surface, made from metal, plastic, rubber, or the like, to rotate a take-up drive means 96 (see FIG. 6), which in turn rotates a take-up spool 92, rotatably mounted in a second or take-up cassette 94, removably mounted on the take-up assembly 46, as described more fully below.

The take-up assembly 46 includes the second or take-up cassette 94 with the take-up film spool 92 rotatably mounted therein, the take-up drive means 96 (FIG. 6), a power source, such as batteries 98, electronics 100, a counter (with display) 102, a frame counting switch 104, an end of film switch 106, illuminating or indicating means 126, 128 and a water detection and alarm means (not shown). The frame counting switch 104, the end of film switch 106 and the water detection means are formed to or secured to the take-up assembly 46 and connected to the electronics 100 and power source therein, in any desired manner. The switches 104 and 106 extend outwardly, away from the take-up assembly, through openings formed in a further film guide means 110, mounted to that end of the take-up assembly which is held in the bezel 42. This further film guide 110 extends through the bezel 42 to guide the film around the sprocket means 82 and under the take-up spool 84, between the take-up spool 84 and film guide 86. When the magazine is secured to the camera 12 with film loaded therein, the switches 104 and 106 operate as follows: switch 104 is preferably a roller actuated snap switch which cooperates with the teeth at one end of the sprocket means 82 to sense film motion by detecting or counting each sprocket tooth as it is rotated by actuation of a camera film advance lever 136 and the film transport means, in a manner known to those skilled in the art. For example, when eight teeth of a six toothed sprocket portion have advanced-actuated the switch 104-counter means in switch 104 pulse the counter 102 and advances the count shown thereon; the end of film switch 106 rides on or is biased against the film 74, away from the sprocket hole areas in the film, and is only operated, as by the actuation of a snap action switch when the film runs out, and &:he switch is allowed to open or close to thereby send a signal that the end of the film has been reached.

As can be seen in FIG. 5, the batteries 98 and electronics 100 are held in a separate compartment 112 in take-up assembly 46. This compartment 112 is normally closed by a removable top cover or plate 114 (see FIG. 3), held to the take-up assembly 46, in any desired manner, such as by a pair of push pins 116, 118. As also shown in FIG. 3, other holding means, such as push pins 120 and 122 may also be used to removably fix a top cover or cap 124 to the second or take-up cassette 94. The electronics 100 is connected to three sensing means, namely, the counter means, the end of film indicator and the water detection means, as well as their respective illuminating and indicating means. The water detection means indicates the presence of water in the magazine by any desired means, such as forming an opening having a wire mounted therein in a bottom wall 142 of take-up assembly 46. The end of film and water detected alarm means are operated by the electronics, so as to flash an indicating means 126, which is preferably a red LED. The electronics freeze the counter and flash the red LED at one speed if the end of film is detected, and freeze the counter and flash the red LED at a second, faster speed if water is detected. Finally, the electronics, in general terms, requires two pulses of a pushbotton operator 108, having a magnet attached thereto, to operate a magnetic switch means (not shown), preferably mounted on the take-up assembly adjacent to the pushbutton operator 108. Operation of &:he pushbutton operator twice actuates the electronics 100 to actuate a further light means, such as a green LED 128, to illuminate the counter display and turns on the counter. The counter display is preferably an LCD, which is easily viewed underwater by the user, when illuminated, through an aligned magnifying lens 130, sealingly fixed to an aperture 132 passing through the rear of the housing 44, adjacent the pushbutton operator 108. The illuminated counter display showing through the magnifying lens 130 will indicate to the user the number of frames that have been exposed on the film and rolled up on the take-up spool, therefore, allowing the user to determine how many out of the total number, of about 260 plus frames, remain. As described above, to prevent accidental operation of the electronics and display illuminating means 128, as by accidentally striking the pushbutton 108, the electronics 100 will only illuminated the display if the pushbutton 108 is pulsed or pressed two times in the space of one second. Furthermore, the illumination may then only be shut-off by operating the pushbutton a further two times.

As can best be seen in FIGS. 2 and 5, the magazine 40 is loaded, as follows: with the camera 12 and magazine apart, the take-up cassette 94 is removed from the take-up assembly 46. Then the leader of the unexposed film 74 is pulled from the first cassette and fed through the camera 12, first under the pressure plate 78, over the sprocket 82 and under the take-up spool 84, as described above. After leaving the camera the film is threaded into an elongated lighttight inlet opening 134 in the second or take-up cassette 94 and onto the take-up spool 92, where it is secured in place, in a known manner. The take-up cassette 94 is then secured to the take-up assembly 46 with the film passing over a roller means 133 mounted on the edge of the take-up assembly 46, and the magazine and camera are secured together, as explained herein. When it is desired to take photographs, the camera is operated by actuating the shutter of the camera in the normal manner by pushing shutter button 137. The film is then advanced through the camera, in the normal manner, by actuating the film advance lever means 136 at the top of the camera. This actuation of the advance lever means 136 rotates the sprocket 82 and the take-up spool 84, together with the serrated disc or thumbwheel 88, in a known manner. Upon rotation of the serrated disc 88, the drive wheel 90 will be frictionally driven, and this in turn will rotate the take-up spool 92 in the take-up cassette 94 by the take-up drive means 96, shown in FIG. 6. The camera 12 includes a slip clutch, in the operating means connected to the advance lever, to keep the film taught.

Figure 6:
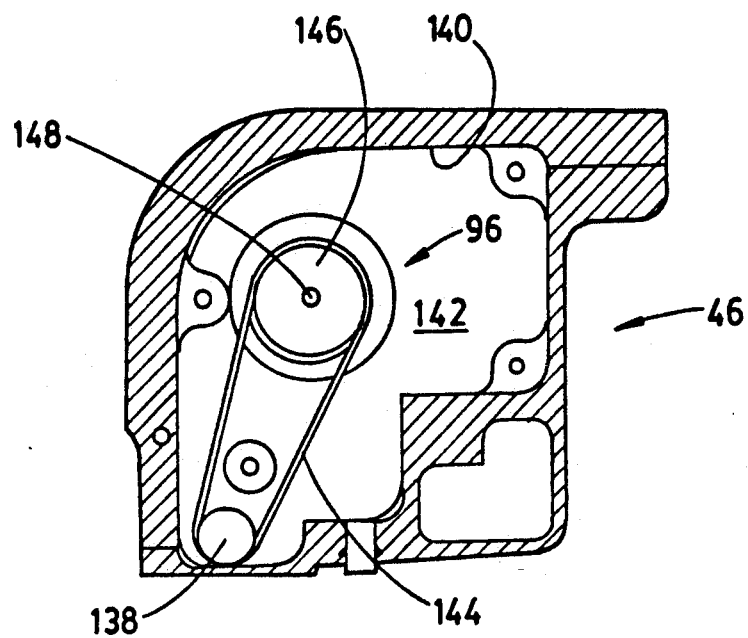
FIG. 6 is a cross-sectional view about line B—B of the take-up assembly of FIG. 3, showing a belt and pulley drive system contained therein.
Figure 7:
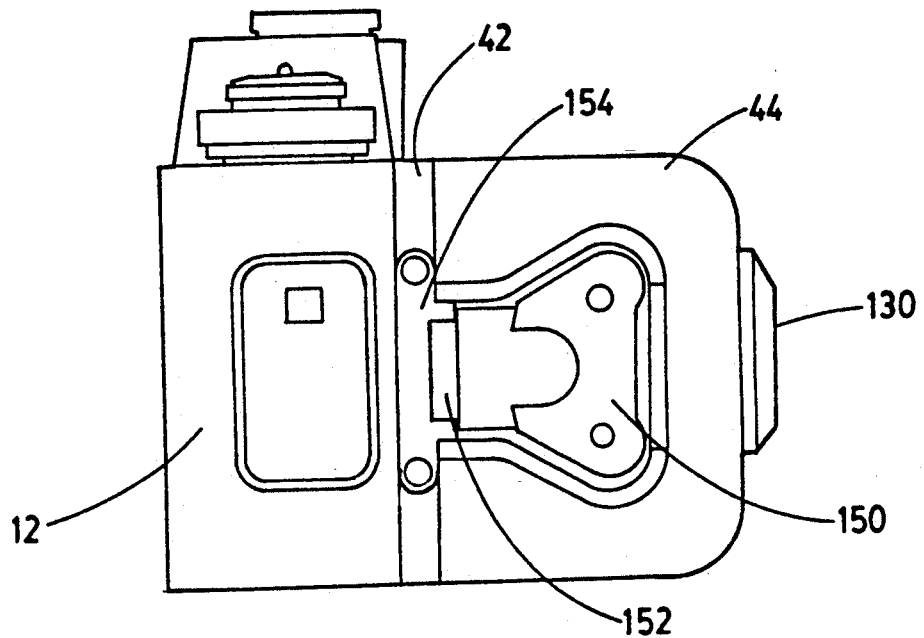
FIG. 7 is a side elevational view of the magazine and camera secured together in the operating position.

As shown in FIG. 6, the drive means 96 includes a drive wheel or pulley 138 mounted in a chamber 140, formed in the lower surface or base 142 of take-up assembly 46. This further drive wheel or pulley 138 is directly coupled to the drive wheel 90, as by a shaft, and mechanically coupled by a belt or chain 144 to a driven or second wheel or pulley 146. This driven pulley is also directly coupled, as by a shaft 148, to a further actuating means, such as a wheel or the like, known to those skilled in the art, on which the take-up spool 92, in take-up cassette 94, is mounted or coupled. The take-up assembly 46 may also include a serrated type disc, mechanically coupled to pulley 138 or pulley 146 to rotate the take-up spool 92 by hand.

It is, therefore, obvious that the actuation of the advance lever 136 in the camera 12 will cause rotation of take-up spool 92, to advance the film 74 through the camera, from the first or film cassette 48 onto the take-up spool 92. This is caused by the rotation of the serrated disc 88, which is frictionally engaged with the drive wheel 90 to rotate the same. Since drive wheel 90 is directly coupled to the drive pulley 138, rotation of the drive wheel also rotates the drive pulley 138. This rotation of the drive pulley 138 moves the belt 144 so as to rotate driven pulley 146, attached shaft 148 and the actuating means coupled to the take-up spool 92.

Various forms of locking mechanisms that are known in the art may be utilized to secure the magazine 40 to the camera. Preferably, however, as shown in FIGS. 2, 3, 5 and 7, the mechanism used herein is both a locking mechanism and an opening assist mechanism. This mechanism includes a pair of finger actuated, rotatable key means 150, mounted on the outside surface of the housing 44, at opposite ends thereof. The key means are preferably limited in their degree of rotation, and are rotatable in opposite directions, for ease in operation. The key means 150 are secured to the exterior of the housing, and cooperate with slidable hook means 152, in a known manner, so that upon rotation of the key means 150 in one direction, the hook means 152 grip further hook type means 154, secured to opposite ends of the bezel 42, to pull the magazine and bezel together so as to snugly and securely clamp the magazine to the bezel. Furthermore, this mechanism also aids in removing the magazine by the action of the sliding hook means 152 pushing against the hook type means 154 on the bezel 42, upon rotation of the key means 150 in the direction opposite to that when locking the camera and magazine together.

Those skilled in the art will appreciate that the above-described preferred embodiment is subject to numerous modifications and adaptations without departing from the scope and spirit of the invention. Therefore, it is to be understood that, within the scope of the appended claims, the invention may be practiced other than as specifically described herein.

What is claimed is:

1. An extended film magazine adapted for use with a camera having means for exposing film and a film transport means including an advance lever means operating a sprocket and take-up spool means for advancing film in the camera between exposures, comprising, in combination:

a bezel having sealing means thereon for attachment to the camera and a magazine housing having a hollow interior;

a first cassette means and a film take-up assembly means supported by said bezel;

said first cassette means including a hollow lighttight interior for receiving and holding an extended length of unexposed film therein, and a light-sealed opening to allow said unexposed film to be fed out of said hollow lighttight interior;

said take-up assembly means including a take-up film cassette to receive and take-up said film from said first cassette after said film has been exposed and advanced along said film transport means in said camera; and a mechanical drive means held within said take-up assembly means connected to said take-up cassette and frictionally coupled to said take-up spool means of said film transport means, whereby upon operation of said advance lever means of said camera, said mechanical drive means will be operated to take-up said film onto said take-up cassette.

2. The extended film magazine of claim 1 wherein said mechanical drive means held within said take-up assembly means includes a drive roller frictionally coupled to a disc mounted on said take-up spool means in said camera.

3. The extended film magazine of claim 2, further including take-up drive means mounted in said take-up assembly means, said take-up drive means mechanically coupled to said drive roller to rotate a further take-up spool rotatably held in said take-up cassette.

4. The extended film magazine of claim 3 wherein said take-up drive means includes a drive pulley, a pulley belt and a driven pulley.

5. The extended film magazine of claim 4 wherein said take-up cassette is removably mounted on said take-up assembly means and includes a lighttight hollow interior having an elongated light-sealed opening therein to allow said exposed film to be fed into said lighttight hollow interior of said take-up cassette, and said further take-up spool is held in said lighttight hollow interior of said take-up cassette and receives and holds said exposed film thereon.

6. The extended film magazine of claim 1, further including first sensing means held on said take-up assembly means and coupled to said sprocket means of said film transport means for detecting the advance of said film and operating a counter means in said take-up assembly means to count the number of exposures on said film taken-up by said take-up cassette.

7. The extended film magazine of claim 6 wherein said magazine housing includes a lens mounted therein through which a display on said counter means may be read, and said take-up assembly means includes illuminating means adjacent said display on said counter to light said display by the actuation of a pushbutton operator fixed to said magazine housing.

8. The extended film magazine of claim 7 wherein said mechanical drive means held within said take-up assembly means includes a drive roller frictionally coupled to a serrated disc mounted on said take-up spool means in said camera, and said drive roller is directly coupled to a take-up drive means including a drive pulley, a pulley belt and a driven pulley mounted in said take-up assembly; said take-up drive means is coupled to a further take-up spool rotatably held in a lighttight hollow interior of said second cassette, with said lighttight hollow interior of said second cassette having a light-sealed opening to allow said exposed film to be fed into said lighttight hollow interior of said second cassette for the receipt and holding of said exposed film on said further take-up spool.

9. The extended film magazine of claim 8, further including a second sensing means held on said take-up assembly means and biased against said film being advanced by said film transport means in said camera for detecting the end of said film advancing through said camera and operating an end of film indicator means in said take-up assembly means, which end of film indicator means may be read through said lens mounted in said magazine housing.

10. The extended film magazine of claim 9, further including a third sensing means held on said take-up assembly means, said third sensing means detecting the presence of water in said magazine housing and operating a water detection alarm means in said take-up assembly means; said water detection alarm means may be read through said lens mounted in said magazine housing.

11. The extended film magazine of claim 10 wherein said illuminating means adjacent said display on said counter and said end of film indicator means and said water detection alarm means are different colored LEDs mounted to said take-up assembly means.

12. The extended film magazine of claim 11 wherein said illuminating means adjacent said display on said counter is a green LED and said end of film indicator means and said water detection alarm means is a red LED.

13. The extended film magazine of claim 12 wherein said first cassette means holds 33 feet of film to be exposed in said camera.

14. The extended film magazine of claim 12, further including a film guide means inserted in a film take-up compartment formed in said camera, below said take-up spool means in said camera.

15. An extended film magazine for use with a camera having an open interior, with means for exposing film and film transport means, including a lever advance means operating a sprocket and take-up spool means for advancing film in the camera open interior between exposures, said extended film magazine comprising:

an open frame having sealing means thereon for attachment between the interior of the camera and a hollow interior of a housing of said extended film magazine to seal said camera and said extended film magazine together;

a first film cassette means and a film take-up assembly means supported by said open frame and held in said hollow interior of said housing of said extended film magazine;

said first film cassette means including a lighttight hollow interior for receiving and holding an extended length of unexposed film therein; said first film cassette also having a light-sealed opening connected to said lighttight hollow interior of said first cassette means to allow said unexposed film to be fed out of said lighttight hollow interior of said first cassette means and into said interior of said camera;

said film take-up assembly means including means to receive and take-up said film from said first film cassette and said camera after said film has been exposed and advanced along said film transport means in said camera;

a mechanical drive means including a drive wheel having a resilient driving surface held within said film take-up assembly means and frictionally coupled to an enlarged disc fixed to said take-up spool means of said film transport means in said camera;

said mechanical drive means having a drive pulley, a pulley belt and a driven pulley mounted in said film take-up assembly means and directly, mechanically coupled between said drive wheel and a further take-up spool rotatably mounted on said film take-up assembly, to operate said further take-up spool to take-up said exposed film from said camera and said first cassette; and a first sensing means held on said film take-up assembly means and coupled to said sprocket means of said film transport means for detecting the advance of said exposed film through said camera and operating a counter means in said film take-up assembly means to count the number of exposures on said film taken-up on said further take-up spool.

16. The extended film magazine for use with a camera of claim 15 wherein said magazine housing includes a magnifying lens mounted therein through which a display on said counter means may be read, and said film take-up assembly means includes a green LED adjacent said display on said counter, to illuminate said display by the actuation of a pushbutton operator fixed to said magazine housing; said mechanical drive means rotates said further take-up spool which is rotatably held in a lighttight hollow interior of a take-up cassette means removably mounted on said film take-up assembly means, and said lighttight hollow interior of said take-up cassette means having a light-sealed opening to allow said exposed film to be fed into said lighttight hollow interior of said take-up cassette means so as to receive and hold said exposed film on said further take-up spool; an end of film sensing means held on said film take-up assembly means and coupled to said film being advanced by said film transport means for detecting the end of said film advancing through said camera and operating an end of film indicator means in said second cassette; said end of film indicator means being a red LED which can be read through said magnifying lens.

17. The extended film magazine for use with a camera of claim 16, further including a water detection sensing means held on said take-up assembly means; said water detection sensing means detecting the presence of water in said magazine housing and operating a water detection alarm means in said take-up assembly means, which water detection alarm means is said red LED.

18. The extended film magazine for use with a camera of claim 17 wherein said first cassette means holds 33 feet of film to be exposed in said camera and a film guide means is inserted in a film take-up compartment formed in said camera, below said take-up spool means in said camera.

19. A combination of an extended film magazine and a camera, in which said camera has an open interior, with means for exposing film and a film transport means including a film advance lever means operating a sprocket and take-up spool means in the camera open interior, comprising:

a substantially rectangular open bezel having sealing means thereon for attachment between the interior of the camera and a hollow interior of a housing for said extended film magazine, to seal said camera and said extended film magazine together;

the hollow film magazine housing including a magnifying lens and a slidable display pushbutton operator mounted thereon;

a first cassette means and a take-up assembly means supported and held in said hollow film magazine housing by said substantially rectangular open bezel;

said first cassette means including a lighttight hollow interior and having a plurality of external flanges which cooperate with said substantially rectangular open bezel and said hollow magazine housing to align said first cassette in said hollow film magazine housing and said camera;

said lighttight hollow interior of said first cassette holding an extended length of unexposed film therein and including a light-sealed elongated slit opening to allow said unexposed film to be fed out of said lighttight hollow interior of said first cassette into said film transport means in said interior of said camera;

said take-up assembly means including a further take-up spool rotatably mounted in a take-up cassette removably secured to said take-up film assembly means;

mechanical drive means including a resilient drive wheel held within said take-up assembly means and frictionally coupled to an enlarged serrated disc formed to said take-up spool means of said film transport means in said camera;

said mechanical drive means having a drive pulley, a pulley belt and a driven pulley mounted in said second cassette and directly, mechanically coupled to said resilient drive wheel and said further take-up spool in said take-up cassette to rotate said further take-up spool upon actuation of said film advance lever means in said camera;

first, second and third sensing means held on said second cassette and electrically connected to a power source;

said first sensing means including a switch coupled to said sprocket means of said film transport means for detecting the advance of said exposed film through said camera and to operate a counter means in said take-up assembly means to count the number of exposures on said film taken-up on said further take-up spool after said sprocket means has advanced a predetermined number of sprocket teeth; said counter means including a display aligned with said magnifying lens so that said display may be read through said magnifying lens;

said second sensing means including an end of film switch biased against said film being advanced by said film transport means in said camera, said end of film switch being operated when there is no more film advancing through said camera to activate a red LED viewed through said magnifying lens to thereby indicate that said magazine is empty of film;

said third sensing means including an opening formed in said take-up assembly means and a wire detecting the presence of water in said housing and activating said red LED if water is sensed therein; and said take-up assembly means includes a green LED adjacent said display on said counter, to light said display by the actuation of said slidable display pushbutton operator fixed to said magazine housing.

20. The combination of an extended film magazine and a camera of claim 19 wherein said first cassette means holds 33 feet of film to be exposed in said camera and a film guide means is inserted in a film take-up compartment formed in said camera, below said take-up spool means in said camera.

* * * * *